July 5, 1960

M. STAUNT 2,943,705

LUBRICATING APPARATUS

Filed Aug. 25, 1958

INVENTOR.
Martin Staunt
BY
Robert H. Wendt
Atty.

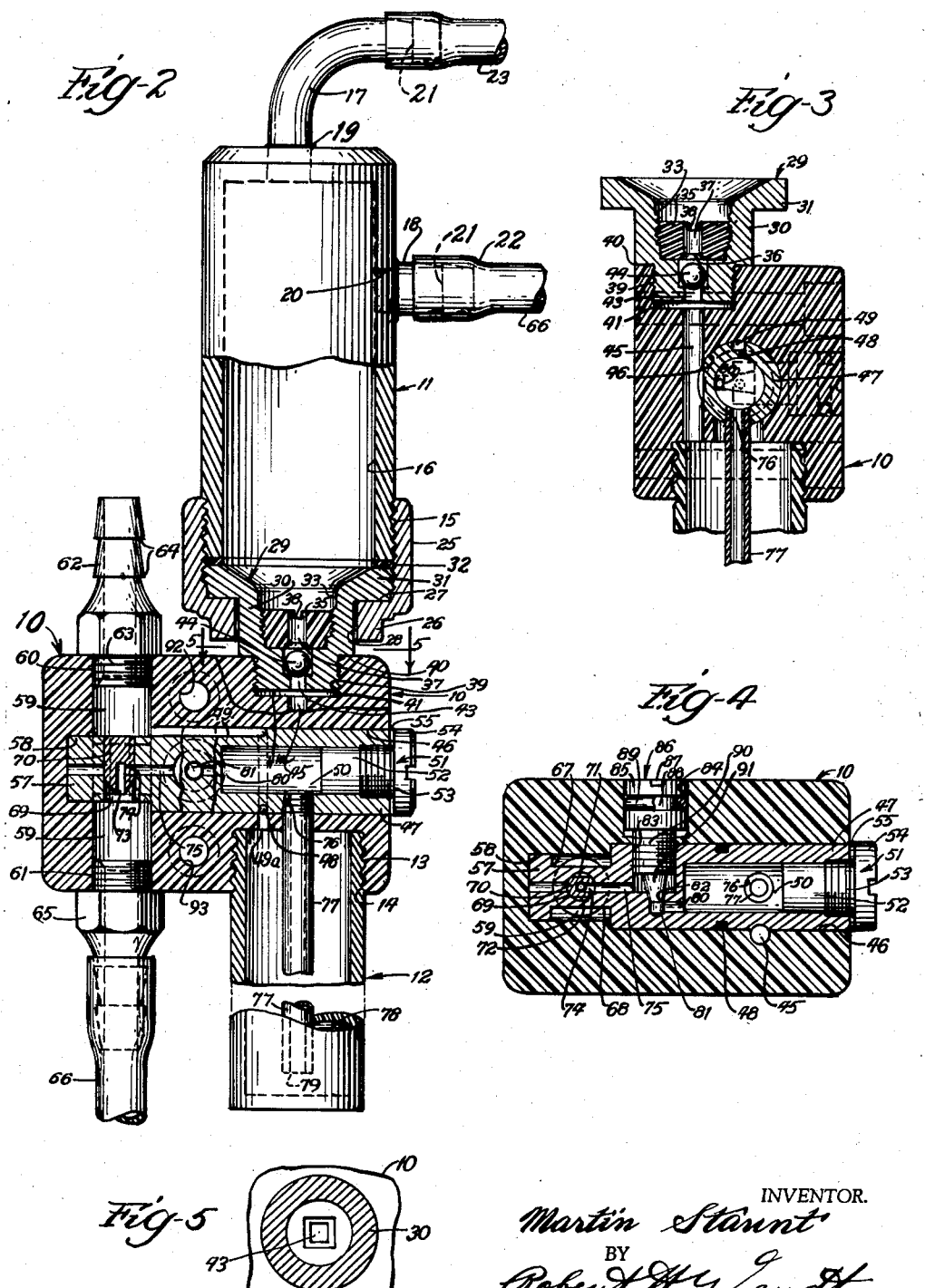

United States Patent Office 2,943,705
Patented July 5, 1960

2,943,705

LUBRICATING APPARATUS

Martin Staunt, Des Plaines, Ill.
(4439 W. Rice St., Chicago 51, Ill.)

Filed Aug. 25, 1958, Ser. No. 757,062

20 Claims. (Cl. 184—55)

The present invention relates to lubricating apparatus and is particularly concerned with a device for producing a mist of lubricant and air for an air-driven dental handpiece, but the invention is of general application and may be used for many different purposes.

One of the objects of the invention is the provision of an improved lubricating system in which the lubricant is reduced to a mist carried by air and introduced into the interior of the housing of the dental handpiece where it passes through the ball bearings and lubricates them and also maintains a constant pressure on the inside of the housing so that filings, grit and other foreign matter are excluded from the housing.

Another object of the invention is the provision of an improved lubricating apparatus for producing an air-lubricant mist, which is smaller in size and more efficient than the devices of the prior art.

Another object of the invention is the provision of an improved lubricator which is simple in construction, which has a minimum number of parts, which can be manufactured more economically, and which may be used for a long period of time without the necessity for repairing or replacing any of its parts.

Another object of the invention is the provision of an improved lubricator having an expendable and replaceable lubricant reservoir, in the form of a plastic vial which is supplied with edible lubricant and a closure cap so that a clean supply of lubricant may be used more often.

Another object of the invention is the provision of an improved lubricator having a reservoir and a separator chamber for mist and liquid from which the mist is taken but the liquid is withheld in the chamber and after the operation has been finished and the air pressure is off, the liquid drains back into the reservoir.

Another object is the provision of an improved lubricating system of the type covered by my prior application Serial No. 620,434, on Dental Handpieces, and an improved lubricator of the type disclosed in said application and in my application S.N. 633,067, Self-Lubricating and Self-Cleaning Dental Hand Pieces, and the disclosures of both said applications are hereby incorporated herein by reference thereto.

Other objects and advantages of the invention will be apparent from the following description and the accompanying drawings in which similar characters of reference indicate similar parts throughout the several views.

Referring to the two sheets of drawings accompanying the specification:

Fig. 2 is a similar view in partial section;

Fig. 3 is a sectional view, taken on the plane of the line 3—3 of Fig. 1;

Fig. 4 is a sectional view, taken on the plane of the line 4—4 of Fig. 1 looking in the direction of the arrows;

Fig. 5 is a fragmentary view, taken on the plane of the line 5—5 of Fig. 2 looking in the direction of the arrows.

Figure 1:
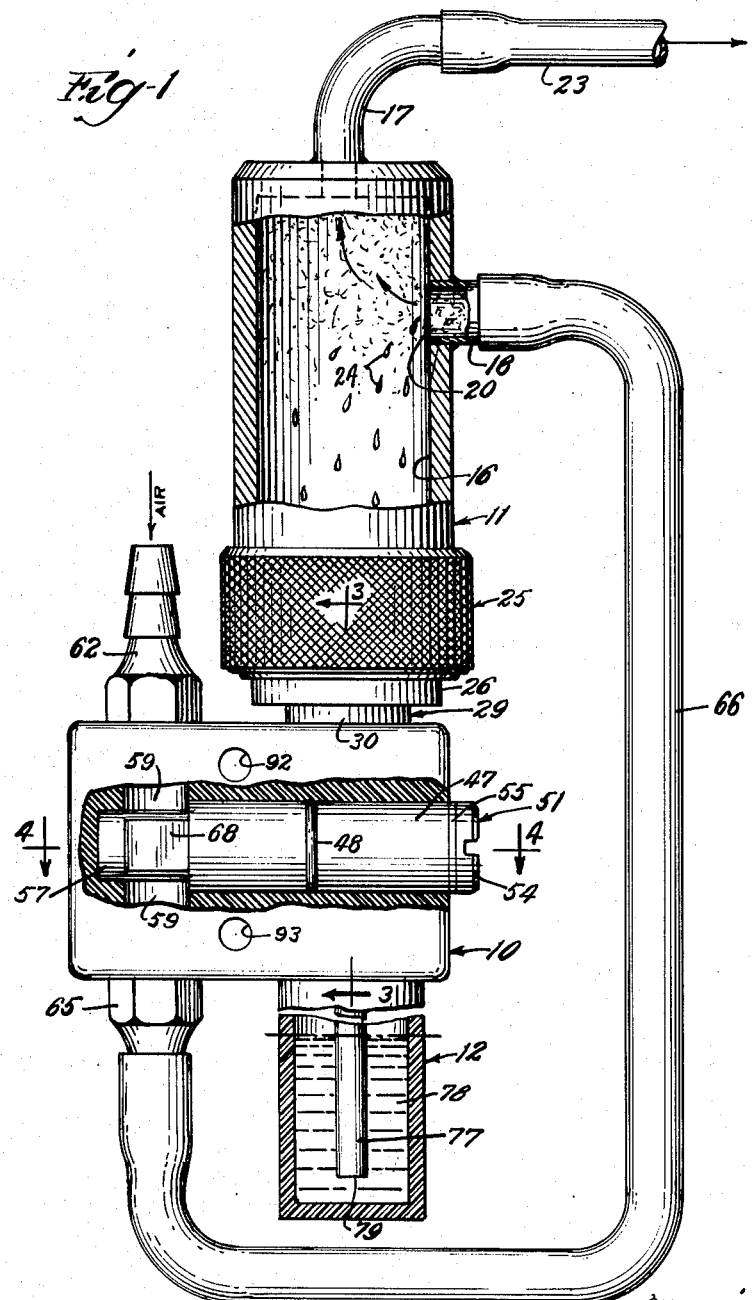
Fig. 1 is a side elevation view of a lubricator embodying the invention.

Referring to Figures 1 and 2, the present lubricator preferably includes a body 10, which may be made of a suitable plastic, such as nylon, a separator chamber 11, and a removable reservoir 12.

The reservoir 12 comprises a small cylindrical container molded out of suitable plastic and having threads 13 at its upper end to receive a complementary screw cap and for threading the reservoir into a threaded bore 14 in the body 10.

Reservoir 12 is filled to a suitable level with edible lubricant; and the supply of lubricant may thus be removed at any time, and the vial may be discarded and replaced with a new one full of clean lubricant.

The separator chamber 11 comprises a cylindrical tubular body having threads 15 at its lower end and having a cylindrical bore 16. The separator chamber 11 may be made of brass and may have the hose fittings 17 and 18 brazed in the apertures 19 and 20.

Each hose fitting has an external rib 21 at its outer end for retaining a plastic conduit or hose 22 or 23.

The brass pipe 18 enters the separator chamber 11 at its side near the top so that the lubricant mist may be discharged through the pipe 17 while the liquid droplets 24 fall to the bottom of the separator chamber 11.

The threaded end 15 fits in a knurled ferrule 25 which has a reduced end portion 26 provided with an annular shoulder 27 and with a cylindrical bore 28, and square sides on 26 for a wrench.

Valve housing plug 29 has a cylindrical body 30 fitting in the bore 28 and is provided with a radial flange 31 resting on the annular shoulder 27. Plug 29 has two holes for a wrench.

An air and liquid tight joint is provided in the threads 15 by a gasket 32, which may be made of Buna N. The gasket is compressed between the end of the separator chamber 11 and by radial flange 31.

The valve housing plug 29 has a threaded cylindrical bore 33 adapted to receive a plastic plug 35 which is also threaded and which provides a valve seat at the lower end 36 of a through bore 37.

The slot 38 in the plug 35 is used with a screw driver to drive the plug into its threaded bore.

Valve housing 29 has a cylindrical portion 30 and a reduced threaded portion 39 starting at an annular shoulder 40, it engages the top of the body 10. A Buna N washer is used at 41a.

The threaded part 39 of the valve housing 29 fits in a threaded bore 41 in the housing 10 with an air-tight fit due to the engagement of the brass with the nylon. The threaded part 39 has a square aperture 43 at its lower end as shown in Figures 3 and 5, so that a stainless steel ball 44 resting on the end of the square aperture 43 does not close the aperture but permits downward leakage.

The stainless steel ball 44 is pressed upward by air pressure when the device is operating and closes the aperture 37 at the sharp lower circular edge 36 preventing leakage when the device is operating.

The purpose of the ball valve is to prevent lubricant from flowing upward when the device is operating and it usually operates for a few minutes at shorter intervals, of a minute or less.

When the device is operating, air and lubricant mist enter at the pipe 18 and the liquid droplets 24 fall to the bottom of the separator chamber 11 while the lubricant mist passes out of the pipe 17 to the air-driven contra angle or to some other handpiece.

When the air is shut off and there is no air pressure forcing the wall 44 upward, the ball drops on the square aperture 43 and the liquid lubricant leaks down through the aperture 45 into the reservoir 12. Thus the present device uses only that portion of the lubricant which has been turned into a mist and returns liquid lubricant to the reservoir 12 to be used over again.

The body 10 comprises a substantially rectangular block of nylon which is provided with a longitudinally extending cylindrical bore 46 for receiving a cylindrical conduit plug 47 which may be made of brass and it contains a valve and a Venturi nozzle.

Plug 47 has a peripheral groove 48 of rectangular shape communicating with reservoir 12 through hole 49a and communicating with bore 59 through groove 49 in plug 47.

Plug 47 has a central cylindrical bore 50 which is closed at its end by a brass plug 51 having a cylindrical body 52 and a threaded portion 53.

A head 54 compresses a "Duprene" gasket 55 between the head and the end of the plug 47, achieving an air and liquid tight closure of the bore 50.

Another bore 45, Fig. 3, Fig. 4, extends through the body 10 to the inside of the reservoir or vial 12 from the ball valve 44 and square aperture 43.

The brass plug 47 has a reduced cylindrical end portion 57 fitting in a cylindrical bore 58. This cylindrical bore 58 communicating with a transversely extending bore 59, which is a through bore having a threaded opening 60 on the top of the body 10, and a threaded opening 61 on the bottom of the body 10.

An inlet air fitting 62 having a reduced threaded end 63 is threaded in the upper bore 60 and has its tubular body provided with ridges 64 for holding a plastic conduit or tube, which leads to a source of air pressure such as a motor compressor and pressure tank.

A second conduit fitting 65 of similar shape is threaded into the bore 61 and is provided with a plastic conduit 66 of a material adapted to withstand oil for carrying atomized lubricant to the separator chamber 11, which is connected to the other end 22 of the plastic conduit 66.

The reduced portion 57 of the brass plug does not wholly obstruct the bore 59 because the brass plug is milled away at 67 above, in Fig. 4, and 68 below, in Fig. 4, so that air from the fitting 62 may pass down the bore 59 and through the milled portions 67, 68 of the plug out of the fitting 65.

In order that the lubricant may be atomized and reduced to a mist, the reduced portion 57 has a vertical through bore 69, Fig. 2, which is filled by a Venturi plug 70 of cylindrical shape except that its upper and lower sides 71 and 72, in Fig. 4, have been flattened to pass air close to the Venturi plug 70.

The Venturi plug may be made of brass and has a cylindrical nozzle bore 73 pointing downward, in Fig. 2, and connects to a transverse bore 74, which communicates with a registering bore 75 in the brass plug 47.

The purpose of bores 74 and 75 is to carry lubricant to the Venturi nozzle 73 which is located backwardly of the end of the bore 69 in which it is located and surrounded with rapidly flowing air through the flat portions 67, 68 of plug 57 and the flat portions 71, 72 of plug 70.

This produces a high velocity stream of air at the Venturi nozzle 73 which results in a suction being exerted on the inside of the bore 73 of the nozzle, and also results in the atomization of the lubricant passing through the nozzle, reducing it to a mist which is mixed with air and entrained into the conduit 66 leading to the separator chamber 11.

The cylindrical bore 50 in the plug 47 has a transverse threaded bore 76, Fig. 3, in its lower side receiving the threaded end of a brass tube 77, which extends into the vial 12 and depends into the supply of lubricant 78, which may pass through its open end 79.

The bore 50 in plug 47 has a smaller bore 80 at its left end, Fig. 4, communicating with a transverse bore 81. The upper end of it acts as a valve seat at 82. Transverse bore 81 communicates with the bore 75 and with a larger threaded bore 83 which is provided with a brass plug 47 and extends into the body 10.

Bore 83 communicates with a larger counter bore 84 in the nylon body 10 for receiving the cylindrical portion 85 of a hardened and ground stainless steel valve plug 86, having a slot 87 for a screw driver.

The stainless steel valve plug 86 has a peripheral groove 88 of rectangular cross section for receiving an O-ring, which achieves an air and liquid tight joint between plug 86 and bore 84.

The plug 86 has a lower threaded portion 90 threaded into bore 83 and has a frusto conical portion 91 which extends into the bore 81 and acts as a valve against the circular upper edge 82 of bore 81 which forms a valve seat.

The amount of flow of lubricant may be adjusted by moving the plug 86 up or down with a screw driver rotating the plug.

92 and 93, Fig. 2, indicate apertures for securing screw bolts by means of which the lubricator is secured to a manifold forming a part of a lubricating system.

The operation of the present lubricator is as follows:

The air employed with the present lubricator may be from the same source that is used with nozzles directing air on the burr for cooling purposes and is subject to the same controls.

In belt-driven handpieces the motor switch turns on the engine motor at the same time a switch is closed through a solenoid valve coil for opening the air valves and the water valves.

When the lubricator is used with air-driven handpieces, the air is turned on to drive the handpiece at the same time the air is supplied to the lubricator. The air under pressure passes into the lubricator at fitting 62 and passes around the Venturi nozzle 70 causing a suction in the nozzle bore which communicates with the reservoir 12 through the depending tube 77. There is air under pressure acting on the top of the lubricant, tending to force the lubricant up the tube and through the bores 50, 80, 81, 75 and 73 to the nozzle.

The amount of lubricant supplied depends on the adjustment of the valve plug 86 and the lubricant is atomized at the nozzle opening 73 into a mist and carried away through the conduit 66 by a flow of air.

Air and lubricant mist go to the separator chamber 11 where the droplets of lubricant 24 fall to the bottom and accumulate only while the air is turned on.

At this time the ball valve 44 is pressed up against the valve seat 36 closing the opening or bore 37 into the separator chamber 11 so that oil accumulates above the bore valve. The air pressure which actuates the ball valve and closes it, comes up the conduit 56 from the space in the vial above the oil.

Only air and lubricant mist go out the top of the separator chamber through the pipe 17 to the contra angle.

As soon as the air is shut off to stop the drive of the burr, the pressure is quickly reduced in the conduits of the body 10 and the ball 44 drops down against the square opening 43 where there are smaller openings 45 about the ball, permitting the lubricant in the separator chamber 11 to run down conduit 56 into the vial.

A dental handpiece is only used for a short time and at intervals and therefore all the oil that is separated from the mist, has an opportunity to run back into the reservoir.

The present lubricator for reducing lubricant to a mist carried by air is simpler and has less parts and may be manufactured more economically than any of the devices of the prior art.

The present unit is much smaller than any of the prior art devices and it uses a replaceable and expendable vial of edible lubricant.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A lubricating apparatus comprising a source of air under pressure, an atomizer body having an air inlet connected to said source, and having a lubricant mist outlet, in alignment with said inlet, said body having a longitudinal cylindrical bore at right angles to the axis of said inlet and outlet, a cylindrical metal plug secured in said longitudinal bore, said body having a transverse cylindrical bore communicating with said inlet and said outlet and located on the said axis, said plug having an end cylindrical portion in said transverse bore and provided with a Venturi insert comprising a plug having a radial conduit leading to an axial nozzle conduit discharging toward said outlet, said end cylindrical portion being cut away at its opposite sides to form a through conduit from inlet to outlet, and said Venturi insert plug having flattened sides providing restricted high speed conduits extending past said nozzle and providing a suction on said nozzle.

2. A lubricating apparatus according to claim 1, in which the cylindrical plug is provided with a transverse threaded bore extending to a longitudinal conduit in said cylindrical plug, which longitudinal conduit extends to the radial conduit in said insert, and a threaded valve plug in said transverse threaded bore.

3. A lubricating apparatus according to claim 2 in which the valve plug has a partially conical end seating against the end of a cylindrical bore.

4. A lubricating apparatus according to claim 2, in which the valve plug has an enlarged cylindrical head fitting in a counterbore and provided with a groove containing an O-ring.

5. A lubricating apparatus according to claim 1, in which said cylindrical plug has an axial bore communicating with said radial conduit in said insert and communicating with a lubricant reservoir.

6. A lubricating apparatus according to claim 5, in which the lubricant reservoir has a depending tube communicating with said radial conduit and dipping in the lubricant for carrying lubricant to the Venturi tube.

7. A lubricating apparatus according to claim 5 in which the reservoir comprises an expendable capped plastic tubular container threaded into a bore in said body.

8. A lubricating apparatus according to claim 5, in which the body carries a separator chamber for lubricant mist and liquid, said chamber having an upper mist outlet, and being connected by conduit to said lubricant mist outlet.

9. A lubricating apparatus according to claim 8 in which the separator container has a drain conduit connected to the reservoir and having a one-way valve in the drain conduit, closed when operated under pressure, and open to return the liquid lubricant to the reservoir under no pressure, no operation conditions.

10. A lubricant atomizer comprising a plastic body provided with a through bore threaded at one end to receive an inlet fitting and threaded at the other end to receive an outlet fitting, said body having a longitudinal bore open at one end and communicating with said through bore, said longitudinal bore being provided with a metal plug fitting therein and extending transversely through said through bore, said metal plug having a longitudinal bore provided with an open end having a closure, and said longitudinal bore communicating with a conduit extending across said through bore and across a transverse bore in the metal plug located in the through bore, a nozzle member located in said transverse bore and having flatted sides permitting air to pass around said nozzle member from inlet to outlet, said nozzle member having a pointed end extending toward said outlet, and having a nozzle bore centrally located in the pointed end and communicating with the conduit extending from the longitudinal bore in said plug, said plug also having a depending tube extending downward from its longitudinal bore, and said body supporting a reservoir about said tube, said plug also having conduits providing communication between the air inlet and the surface of liquid in the reservoir to place a pressure on the liquid and urge it out of the nozzle bore.

11. A lubricant atomizer according to claim 10, in which the reservoir comprises an expendable transparent plastic container for oil, having a threaded end threaded into the bore in said body.

12. A lubricant atomizer according to claim 10, in which communication between the longitudinal bore and the nozzle member is by conduits provided with an adjustable metering valve for determining the amount of lubricant supplied to the nozzle.

13. A lubricant atomizer according to claim 10, in which the body supports an air-lubricant separator comprising a chamber having an outlet at its top and having an inlet connected by a conduit to the first-mentioned outlet and conducting air and oil into the separator chamber near its top so that liquid oil drops downward and air containing oil mist goes out of the top of the separator chamber.

14. An apparatus for producing an air-lubricant mist, comprising an elongated body having a longitudinal bore therein and having a transverse threaded bore communicating with said longitudinal bore, a lubricant reservoir having its upper end threaded into said threaded bore, said body having a longitudinally extending metal plug secured in said longitudinal bore and provided with a longitudinal conduit, a tube depending from said latter conduit into lubricant in said reservoir, an air pressure inlet in said body, an air-lubricant mist outlet in said body, said plug having a transverse through bore communicating with said inlet and said outlet, and a Venturi insert partially filling said through bore and having a nozzle directed toward said outlet and operatively communicating with said depending tube through said plug conduit.

15. An apparatus according to claim 14, in which the metal plug has a conduit from the air pressure inlet to the surface of the lubricant in the reservoir, to place pressure on said lubricant to feed lubricant to the Venturi nozzle.

16. An apparatus according to claim 14, in which the body has a mist-liquid separator connected to the outlet and provided with an upper air-mist outlet.

17. An apparatus according to claim 16, in which the separator has a second liquid outlet connected to the reservoir, to discharge liquid into said reservoir when the air pressure in turned off.

18. An apparatus according to claim 17, in which the separator has a ball valve in its liquid outlet which is connected to said reservoir, the ball valve closing against a circular seat to close said liquid outlet to the reservoir when operating under air pressure.

19. An apparatus according to claim 18, in which the ball valve drops by gravity to a non-circular seat when not under air pressure, to return the liquid to the reservoir from the separator.

20. An apparatus according to claim 14, in which the metal plug has a valved longitudinal conduit between the depending tube and the Venturi nozzle, and the valve is adjustable to determine the amount of lubricant fed to the Venturi nozzle.

References Cited in the file of this patent

UNITED STATES PATENTS

| | | |
|---|---|---|
| 2,215,699 | Heftler | Sept. 24, 1940 |
| 2,776,025 | Schweisthal | Jan. 1, 1957 |
| 2,778,619 | Goodyer | Jan. 22, 1957 |